(12) United States Patent
Terashima et al.

(10) Patent No.: US 8,183,796 B2
(45) Date of Patent: May 22, 2012

(54) STEPWISE REPAIRING FOR ELECTRODE OF DISCHARGE LAMP

(75) Inventors: Tetsuo Terashima, Chino (JP); Kentaro Yamauchi, Ashiya (JP); Shigeyasu Soma, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 750 days.

(21) Appl. No.: 12/314,901

(22) Filed: Dec. 18, 2008

(65) Prior Publication Data

US 2010/0156313 A1 Jun. 24, 2010

(51) Int. Cl.
*G05F 1/00* (2006.01)
(52) U.S. Cl. ......... 315/307; 315/299; 315/308; 315/300
(58) Field of Classification Search .................. 315/291, 315/297, 299–302, 307, 308, 326
See application file for complete search history.

(56) References Cited

U.S. PATENT DOCUMENTS

| | | | |
|---|---|---|---|
| 7,511,432 B2 | 3/2009 | Watanabe et al. | |
| 7,800,314 B2 | 9/2010 | Yamauchi et al. | |
| 2007/0236157 A1* | 10/2007 | Okamoto | 315/291 |

FOREIGN PATENT DOCUMENTS

| | | |
|---|---|---|
| JP | A 2003-264094 | 9/2003 |
| JP | A 2004-039563 | 2/2004 |
| JP | A-2005-276623 | 10/2005 |
| JP | A 2005-327744 | 11/2005 |
| JP | A 2006-120654 | 5/2006 |
| JP | A-2008-300309 | 12/2008 |
| WO | WO 2004/066687 A1 | 8/2004 |

* cited by examiner

*Primary Examiner* — Douglas W Owens
*Assistant Examiner* — Jianzi Chen
(74) *Attorney, Agent, or Firm* — Oliff & Berridge, PLC

(57) ABSTRACT

A drive device that drives a discharge lamp including first and second electrodes includes a lighting circuit, a current control unit, a deformation detection unit, a current modulation unit, and a modulation enhancement unit. The lighting circuit supplies alternating current to the electrodes. The current control unit regulates the lighting circuit to control the alternating current. The deformation detection unit detects deformation of the surface shape of the electrodes. The current modulation unit modulates the controlled alternating current when the deformation is detected. The modulation enhancement unit increases a modulation ratio when the deformation is detected while modulating the alternating current.

11 Claims, 13 Drawing Sheets

Fig.9

| ANODE DUTY RATIO (%) | INITIAL PRODUCT | DEGRADED PRODUCT |
|---|---|---|
| 50 | ※ | ※ |
| 55 | ○ | ※ |
| 60 | ○ | ○ |
| 65 | △ | ○ |
| 70 | × | △ |

※ : NO MELTING
○ : SURFACE OF PROJECTING PART MELTED,
   NO CHANGE IN SHAPE OF PROJECTING PART
△ : CHANGE IN SHAPE OF PROJECTING PART  SMALL
× : CHANGE IN SHAPE OF PROJECTING PART  LARGE

Fig.11

| BIAS RATIO(%) | INITIAL PRODUCT | DEGRADED PRODUCT |
|---|---|---|
| 0 | ※ | ※ |
| 5 | ※ | ※ |
| 10 | ※ | ※ |
| 15 | ※ | ※ |
| 20 | ○ | ※ |
| 25 | ○ | ○ |
| 30 | ○ | ○ |
| 40 | ◆ | ◆ |

※ : NO MELTING
○ : SURFACE OF PROJECTING PART MELTED, NO CHANGE IN SHAPE OF PROJECTING PART
△ : CHANGE IN SHAPE OF PROJECTING PART SMALL
× : CHANGE IN SHAPE OF PROJECTING PART LARGE
◆ : SCROLL NOISE GENERATED

STEPWISE REPAIRING FOR ELECTRODE OF DISCHARGE LAMP

CROSS-REFERENCE TO RELATED APPLICATIONS

The present application claims the priority based on Japanese Patent Applications No. 2007-159833 filed on Jun. 18, 2007, No. 2007-159835 filed on Jun. 18, 2007, No. 2008-151392 filed on Jun. 10, 2008, and No. 2008-151393 filed on June 10, the disclosures of which are hereby incorporated by reference in its entirety.

BACKGROUND

1. Technical Field

The invention relates to technology for driving a discharge lamp.

2. Related Art

For the discharge lamp used for the light source of a projector (projection device), known are high intensity discharge lamps (HID lamps) such as high pressure mercury lamps, metal halide lamps, high pressure sodium lamps and the like. Generally, the discharge lamp for a projector receives a supply of alternating current (AC), and emits light by an arc discharge generated between two electrodes. Projecting parts that become the arc origin point are formed at each of the electrodes of the discharge lamp to stabilize the arc discharge between the electrodes. The shrinkage or loss of the projecting part at the electrode is a cause of flicker or arc jump. The flicker is the phenomenon of the light emitted from the discharge lamp blinking, and the arc jump is the phenomenon of the illuminance of the light emitted from the discharge lamp decreasing due to the arc origin point moving and the arc length becoming longer.

In the past, to prevent the shrinkage or loss of the projecting part which becomes a cause of flicker and arc jump, technology was proposed for maintaining the projecting part by adjusting the electrode temperature.

SUMMARY

However, with the technology, though it was possible to maintain the projecting part of the electrode, as the discharge lamp lit time increased, an asperity occurred on the surface of the projecting part, and there was the problem that the projecting part became deformed due to the asperity. The same as with projecting part shrinkage or loss, the deformation of the projecting part due to the asperity also becomes a cause of flicker and arc jump.

An advantage of some aspect of the invention is to provide technology that can lengthen the life of a discharge lamp.

An advantage of some aspects of the invention is intended to address the problem at least in part, and can be reduced to practice as described below.

A drive device according to a first aspect of the invention is a drive device that drives a discharge lamp. The drive device includes a lighting circuit, a current control unit, a deformation detection unit, a current modulation unit, and a modulation enhancement unit. The discharge lamp includes first and second electrodes for generating arc discharge to emit light. The lighting circuit supplies alternating current to the first and second electrodes. The current control unit regulates the lighting circuit to control the alternating current. The deformation detection unit detects deformation of the surface shape of the first and second electrodes. The current modulation unit modulates the alternating current controlled by the current control unit when the deformation detection unit detects the deformation of the surface shape. The modulation enhancement unit increases a modulation ratio at which the current modulation unit modulates the alternating current when the deformation detection unit further detects the deformation of the surface shape while modulating the alternating current by the current modulation unit. With the drive device of the first aspect of the invention, it is possible to increase the modulation rate of the alternating current supplied to these electrodes according to the deformation of the surface shape of the first and second electrodes. This makes it possible to repair the first and second electrodes while preventing insufficient melting and excessive melting of the first and second electrodes. As a result, it is possible to lengthen the life of the discharge lamp.

A light source device according to a second aspect of the invention is a light source device including a discharge lamp, a lighting circuit, a current control unit, a deformation detection unit, a current modulation unit, and a modulation enhancement unit. The discharge lamp includes first and second electrodes for generating arc discharge to emit light. The lighting circuit supplies alternating current to the first and second electrodes. The current control unit regulates the lighting circuit to control the alternating current. The deformation detection unit detects deformation of the surface shape of the first and second electrodes. The current modulation unit modulates the alternating current controlled by the current control unit when the deformation detection unit detects the deformation of the surface shape. The modulation enhancement unit increases a modulation ratio at which the current modulation unit modulates the alternating current when the deformation detection unit further detects the deformation of the surface shape while modulating the alternating current by the current modulation unit. The light source device of the second aspect of the invention makes it possible to repair the first and second electrodes while preventing insufficient melting and excessive melting of the first and second electrodes.

A projector according to a third aspect of the invention is a projector that projects an image. The projector includes a discharge lamp, a lighting circuit, a current control unit, a deformation detection unit, a current modulation unit, and a modulation enhancement unit. The discharge lamp includes first and second electrodes for generating arc discharge to emit light. The lighting circuit supplies alternating current to the first and second electrodes. The current control unit regulates the lighting circuit to control the alternating current. The deformation detection unit detects deformation of the surface shape of the first and second electrodes. The current modulation unit modulates the alternating current controlled by the current control unit when the deformation detection unit detects the deformation of the surface shape. The modulation enhancement unit increases a modulation ratio at which the current modulation unit modulates the alternating current when the deformation detection unit further detects the deformation of the surface shape while modulating the alternating current by the current modulation unit. The projector of the third aspect of the invention makes it possible to repair the first and second electrodes while preventing insufficient melting and excessive melting of the first and second electrodes.

A drive method according to a fourth aspect of the invention is a drive method for driving a discharge lamp including first and second electrodes for generating arc discharge to emit light. The drive method includes the steps of supplying, detecting, modulating and increasing. In the step of supplying, alternating current is supplied to the first and second electrodes. In the step of detecting, deformation of the surface shape of the first and second electrodes is detected. In the step of modulating, the alternating current for supplying to the first and second electrodes is modulated when the deformation of the surface shape is detected. In the step of increasing, a modulation ratio for modulating the alternating current is increased when the deformation of the surface shape is further detected while the modulating of the alternating current. The drive method of the fourth aspect of the invention makes it possible to repair the first and second electrodes while preventing insufficient melting and excessive melting of the first and second electrodes.

The invention is not limited to being embodied as a drive device, a light source device, a projector and a drive method. The invention may be reduced to practice in various other modes such as a projector system and a computer program for performing the functions of driving a discharge lamp. The invention should not be construed as limited to the embodiments set forth hereinabove, and naturally various modifications such as the following may be made herein without departing from the scope of the invention.

These and other objects, features, aspects, and advantages of the invention will become more apparent from the following detailed description of the preferred embodiments with the accompanying drawings.

BRIEF DESCRIPTION OF THE DRAWINGS

The invention will be described with references to the accompanying drawings in which:

FIG. 9 is an explanatory drawing showing experiment results with an anode duty ratio varied and alternating current supplied to the electrodes;

FIG. 11 is an explanatory drawing showing experiment results with alternating current supplied to electrodes with a bias ratio of an anode period changed;

DESCRIPTION OF THE PREFERRED EMBODIMENTS

In order to provide a better understanding of the constitution and advantages of the invention, a projector according to an aspect of the invention will be described below.

A. Embodiments

A1. Constitution of the Projector

Figure 1:
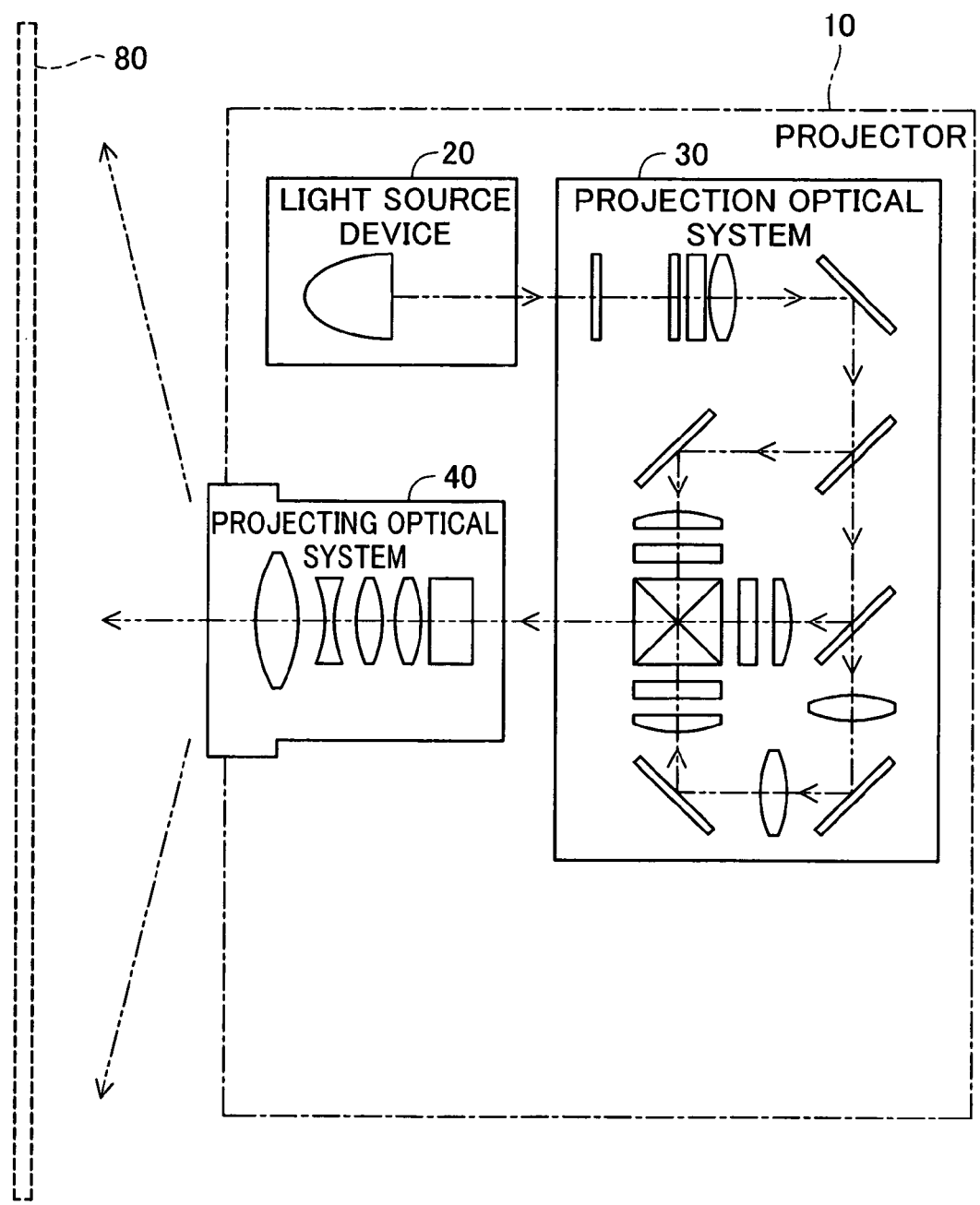
FIG. 1 is an explanatory drawing principally showing constitution of a projector.

FIG. 1 is an explanatory drawing principally showing the constitution of the projector 10. The projector 10 projects an image on a screen 80. The screen 80 is a flat surface on which the image is projected, and can be a movie screen or can be a wall surface.

The projector 10 is equipped with a light source device 20, a projection optical system 30, and a projecting optical system 40. The light source device 20 of the projector 10 emits light as the light source, and the light emitted from the light source device 20 is supplied to the projection optical system 30. The details of the light source 20 will be described later.

The projection optical system 30 of the projector 10 generates projection light for representing an image from the light supplied from the light source device 20. The projection light generated by the projection optical system 30 is sent to the projecting optical system 40. With this embodiment, the projection optical system 30 is a color separation and synthesis optical system, which separates the light supplied from the light source device 20 into red colored light, green colored light, and blue colored light, and after respectively modulating these with three spatial light modulators, synthesizes these lights again into one light to generate the projection light. With this embodiment, the number of spatial light modulators is three, but with other embodiments, this can also be less than three or can be more than three. With this embodiment, the spatial light modulator is a transmission type liquid crystal panel that modulates transmitted light, but with other embodiments, it is also possible to use a reflective type liquid crystal panel that modulates reflected light, and also to use a micro mirror type light modulation device such as a digital micromirror device (DMD (registered trademark)).

The projecting optical system 40 of the projector 10 projects the projection light generated by the projection optical system 30 onto the screen 80. With this embodiment, the projecting optical system 40 is a projecting lens unit for which a plurality of lenses such as a front lens, zoom lens, master lens, focus lens and the like are arrayed. Note that the projecting optical system 40 is not limited to a projecting lens unit, but can also be an optical system that reflects projection light generated by the projection optical system 30 onto the screen 80 using at least one of an aspherical lens, a magnifying lens, a diffusion glass, an aspherical mirror, and a reflective mirror.

A2. Detailed Constitution of the Light Source Device

Figure 2:
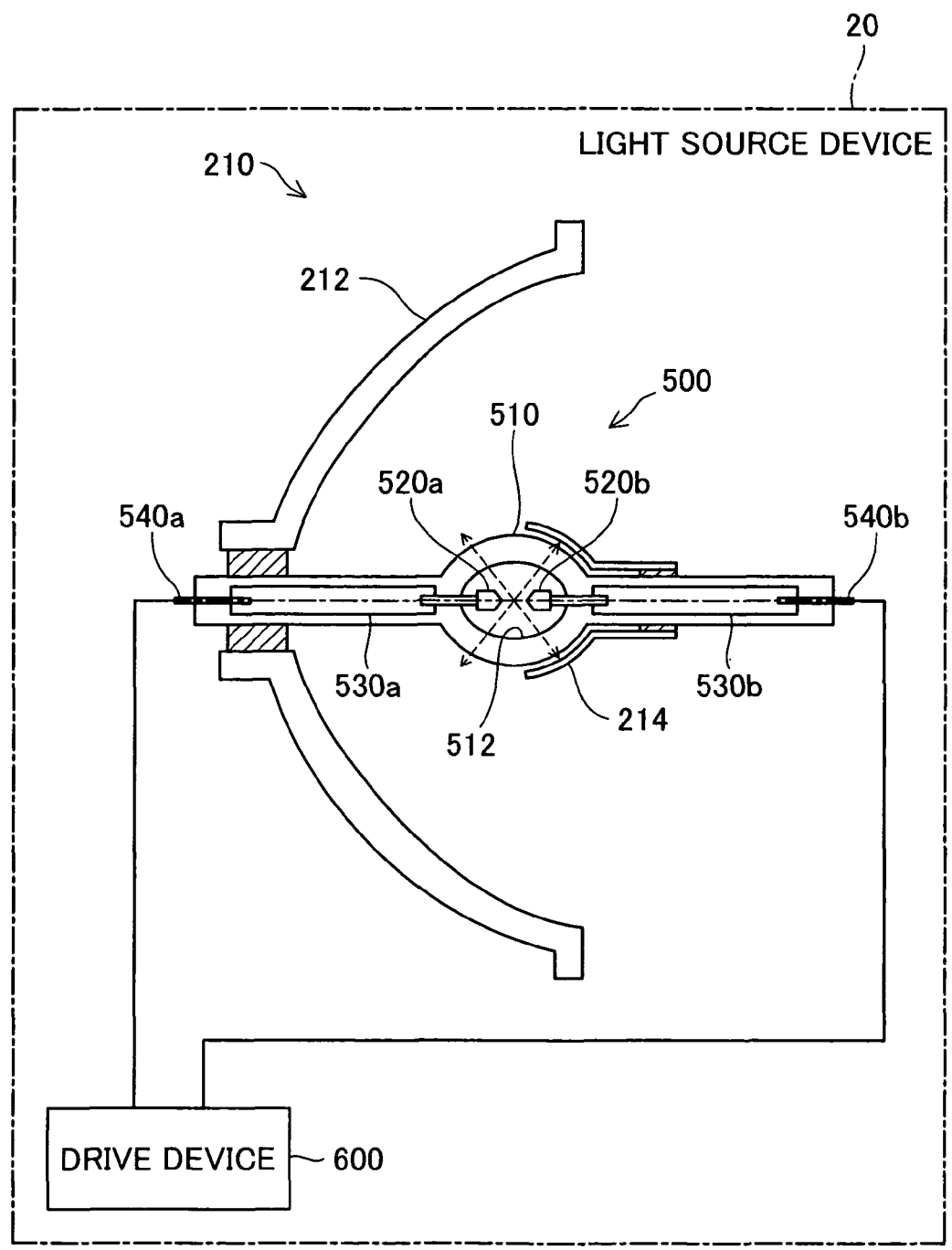
FIG. 2 is an explanatory drawing showing detailed constitution of a light source device of the projector.

FIG. 2 is an explanatory drawing showing the detailed constitution of the light source device 20 of the projector 10. The light source device 20 is equipped with a light source unit 210 and a drive device 600. The light source unit 210 of the light source device 20 is equipped with a main reflective mirror 212, a sub reflective mirror 214, and a discharge lamp 500.

The discharge lamp 500 of the light source unit 210 is equipped with a luminous tube 510, electrodes 520a and 520b, conductive members 530a and 530b, and electrode terminals 540a and 540b. The discharge lamp 500 is driven by the drive device 600, and light is emitted by the arc discharge generated between the electrode 520a which is the first electrode and the electrode 520b which is the second electrode. Details of the drive device 600 will be described later.

The luminous tube 510 of the discharge lamp 500 is a translucent silica glass tube for which the center part bulges in a sphere shape, and at the center part of the luminous tube 510 is formed a discharge space part 512 in which is sealed gas that includes a discharge medium such as a rare gas, mercury, metal halogen compound or the like.

The electrodes 520a and 520b of the discharge lamp 500 are arranged separated from the discharge space part 512 of the luminous tube 510, and generate an arc discharge inside the discharge space part 512 of the luminous tube 510. With this embodiment, the electrodes 520a and 520b are made of tungsten. The details of the electrodes 520a and 520b are described later.

The conductive member 530a of the discharge lamp 500 is a conductor that electrically connects the electrode 520a and the electrode terminal 540a, and the conductive member 530b of the discharge lamp 500 is a conductor that electrically connects the electrode 520b and the electrode terminal 540b. With this embodiment, the conductive members 530a and 530b are molybdenum foil, and are sealed in the luminous tube 510.

The electrode terminals 540a and 540b of the discharge lamp 500 are conductors that introduce alternating current supplied from the drive device 600 to the electrodes 520a and 520b, and are respectively provided at both end parts of the luminous tube 510.

The main reflective mirror 212 of the light source unit 210 has a concave shaped reflective surface. The main reflective mirror 212 is provided on the end part of the electrode 520a side of the discharge lamp 500, and the light emitted from the discharge lamp 500 is reflected to the projection optical system 30. With this embodiment, the reflective surface of the main reflective mirror 212 is a rotating elliptical shape, but with other embodiments, it can also be a rotating parabolic shape. With this embodiment, the main reflective mirror 212 is made of silica glass, but with other embodiments, it can also be made of crystallized glass.

The sub reflective mirror 214 of the light source unit 210 has a hemispherical reflective surface smaller than the main reflective mirror 212. The sub reflective mirror 214 is provided on the electrode 520b side of the center part formed by the discharge space part 512 of the discharge lamp 500, and of the light emitted from the discharge lamp 500, the light emitted to the electrode 520b side is reflected to the main reflective mirror 212. With this embodiment, the sub reflective mirror 214 is made of silica glass, but with other embodiments, it can also be made of crystallized glass.

Figure 3:
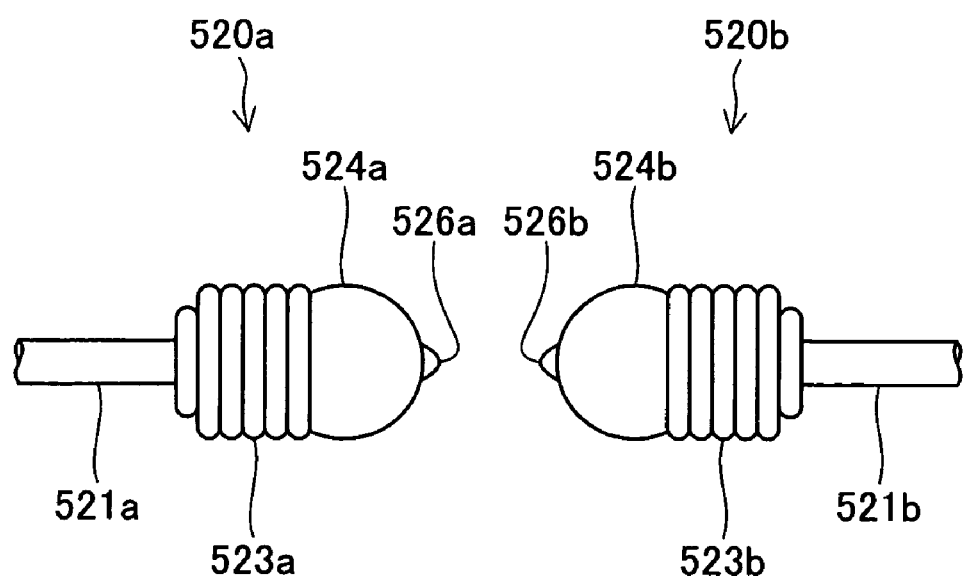
FIG. 3 is an explanatory drawing showing detailed constitution of electrodes.

FIG. 3 is an explanatory drawing showing the detailed constitution of the electrodes 520a and 520b. The electrodes 520a and 520b are equipped with shaft parts 521a and 521b, coil parts 523a and 523b, block parts 524a and 524b, and projecting parts 526a and 526b. The shaft parts 521a and 521b are rod shaped members made of tungsten extending toward the other electrodes 520b and 520a. By winding tungsten wires around the tips of the shaft parts 521a and 521b, and then heating and melting the tips, of the wires made of tungsten, the parts that are not completely melted are formed as coil parts 523a and 523b, and of the wires made of tungsten, the parts that are completely melted are formed as the block parts 524a and 524b. The block parts 524a and 524b are formed on the tips of the shaft parts 521a and 521b facing opposite the other electrodes 520b and 520a, and have a diameter larger than the shaft parts 521a and 521b. The projecting parts 526a and 526b are formed on the block parts 524a and 524b near the other electrodes 520b and 520a, and project facing the other electrodes 520b and 520a.

Figure 4:
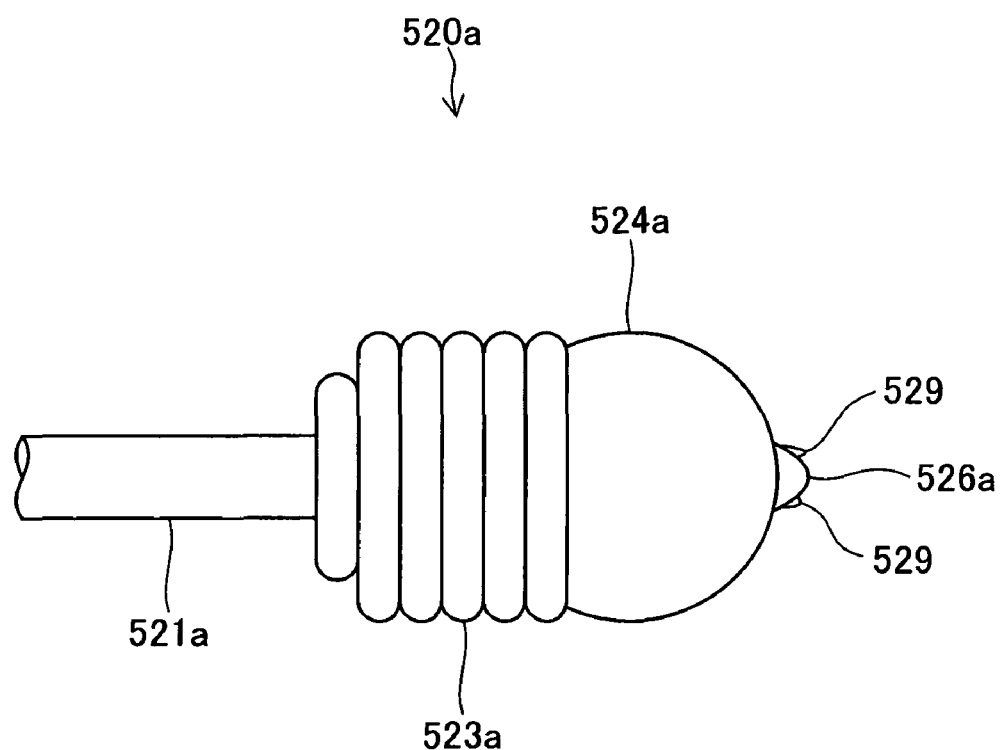
FIG. 4 is an explanatory drawing showing an aspect of asperities formed on the electrode.

FIG. 4 is an explanatory drawing showing an aspect of asperities 529 formed on the electrode 520a. In FIG. 4, the state with the asperity 529 formed on the electrode 520a is shown, but the asperity 529 can be formed in the same manner on the electrode 520b. Generally, as the cumulative time of the discharge lamp 500 being lit increases, asperity 529 smaller than the projecting parts 526a and 526b is formed on the surface of the projecting parts 526a and 526b of the electrodes 520a and 520b. When the projecting parts 526a and 526b are deformed by the asperity 529, the origin point of the arc generated between the electrodes 520a and 520b moves to the asperity 529, and flicker or arc jump occurs. With this embodiment, when the asperity 529 is formed on the projecting parts 526a and 526b of the electrodes 520a and 520b, the alternating current supplied to the electrodes 520a and 520b is modulated by the drive device 600. By doing this, it is possible to melt the asperity 529 and repair the projecting parts 526a and 526b in a state with the discharge lamp 500 lit.

A3. Detailed Constitution of the Drive Device

Figure 5:
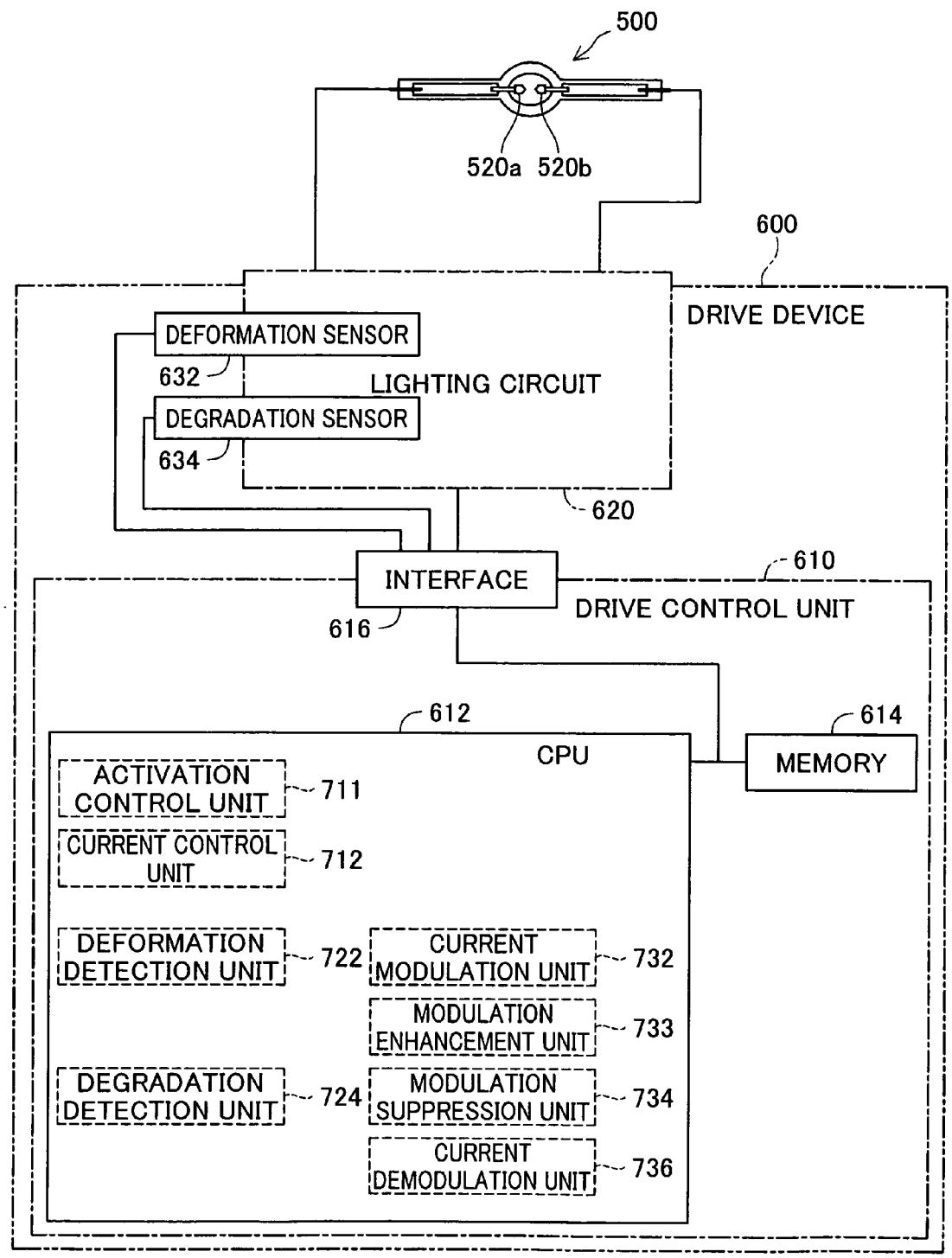
FIG. 5 is an explanatory drawing principally showing detailed constitution of a drive device of the light source device.

FIG. 5 is an explanatory drawing principally showing the detailed constitution of the drive device 600 of the light source device 20. The drive device 600 is equipped with a drive control unit 610, a lighting circuit 620, a deformation sensor 632, and a degradation sensor 634.

The lighting circuit 620 of the drive device 600 is an electrical circuit equipped with an igniter circuit that starts up the discharge lamp 500 or an inverter circuit that generates the alternating current that drives the discharge lamp 500, and based on instructions from the drive control unit 610, supplies alternating current to the electrodes 520a and 520b of the discharge lamp 500.

The drive control unit 610 of the drive device 600 is an electrical circuit for controlling the operation of the lighting circuit 620, and is equipped with a startup control unit 711, a current control unit 712, a deformation detection unit 722, a degradation detection unit 724, a current modulation unit 732, a modulation enhancement unit 733, a modulation suppression unit 734, and a current demodulation unit 736.

The startup control unit 711 of the drive control unit 610 executes control for starting up the discharge lamp 500 by outputting a control signal to the lighting circuit 620. The current control unit 712 of the drive control unit 610, after the discharge lamp 500 is started up by the startup control unit 711, controls the alternating current supplied from the lighting circuit 620 in normal mode by outputting control signals to the lighting circuit 620. Details of alternating current in the normal mode will be described later.

The deformation detection unit 722 of the drive control unit 610 detects the deformation of the surface shape of the electrodes 520a and 520b, specifically, the deformation of the projecting parts 526a and 526b by the asperity 529 formed on the electrodes 520a and 520b, based on the output signals from the deformation sensor 632. With this embodiment, the deformation sensor 632 is a current sensor that detects the alternating current supplied to the electrodes 520a and 520b, and the deformation detection unit 722 detects the variation of the current value due to flicker or arc jump that occurs due to the asperity 529 as deformation of the surface shape of the electrodes 520a and 520b. With other embodiments, it is also possible to detect the deformation of the electrodes 520a and 520b based on image analysis using an imaging sensor for the deformation sensor 632, and it is also possible to detect the deformation of the electrodes 520a and 520b based on the variation of the illuminance emitted from the discharge lamp 500 using an illuminance sensor for the deformation sensor 632.

When deformation of the projecting parts 526a and 526b is detected by the deformation detection unit 722, the current modulation unit 732 of the drive control unit 610 controls the alternating current supplied from the lighting circuit 620 in the repair mode by modulating the normal mode alternating current controlled by the current control unit 712. The repair mode by the current modulation unit 732 is a mode that repairs the projecting parts 526a and 526b by melting the asperity 529 with the discharge lamp 500 in a lit state by modulating the alternating current supplied to the electrodes 520a and 520b. The details of the alternating current in the repair mode will be described later.

When deformation of the projecting parts 526a and 526b is detected by the deformation detection unit 722 while alternating current is being modulated by the current modulation unit 732, the modulation enhancement unit 733 of the drive control unit 610 increases the modulation ratio which is the ratio by which the alternating current is modulated from the normal mode to the repair mode by the current modulation unit 732.

The degradation detection unit 724 of the drive control unit 610 detects the degradation progress state of the electrodes 520a and 520b based on the output signals from the degradation sensor 634. With this embodiment, the degradation sensor 634 is a voltage sensor that detects the voltage between the electrodes 520a and 520b, and the degradation detection unit 724 detects the degradation progression state of the electrodes 520a and 520b based on the voltage between the electrodes 520a and 520b. Generally, as the cumulative time of the discharge lamp 500 being lit increases, the tip parts of the electrodes 520a and 520b are depleted. When the tip parts of the electrodes 520a and 520b are depleted, the distance between the electrodes 520a and 520b increases, and the voltage between the electrodes 520a and 520b rises. With other embodiments, it is also possible to use a timer for the degradation sensor 634 to detect the degradation progress status of the electrodes 520a and 520b based on the cumulative time of the discharge lamp 500 being lit.

The modulation suppression unit 734 of the drive control unit 610 suppresses an increase in the modulation ratio by the modulation enhancement unit 733 according to the degradation progress status detected by the degradation detection unit 724.

When deformation of the electrodes 520a and 520b is not detected by the deformation detection unit 722 while the alternating current is being modulated by the current modulation unit 732, the current demodulation unit 736 of the drive control unit 610 returns the alternating current modulated by the current modulation unit 732 to its original state. Specifically, when the projecting parts 526a and 526b of the electrodes 520a and 520b are repaired during the repair mode, the current demodulation unit 736 changes the mode for controlling the alternating current supplied to the electrodes 520a and 520b from the repair mode to the normal mode.

With this embodiment, the drive control unit 610 is equipped with a central processing unit (hereafter, CPU) 612 that executes various arithmetic processes, a memory 614 for storing data processed by the CPU 612, and an interface 616 for exchanging data with items outside the drive control unit 610. With this embodiment, each function of the startup control unit 711, the current control unit 712, the deformation detection unit 722, the degradation detection unit 724, the current modulation unit 732, the modulation enhancement unit 733, the modulation suppression unit 734, and the current demodulation unit 736 are executed by the CPU 612 operating based on the software stored in the memory 614, but as other embodiments, it is also possible to realize these by the electronic circuits of the drive control unit 610 operating based on the physical circuit constitution.

A4. Operation of the Projector

Figure 6:
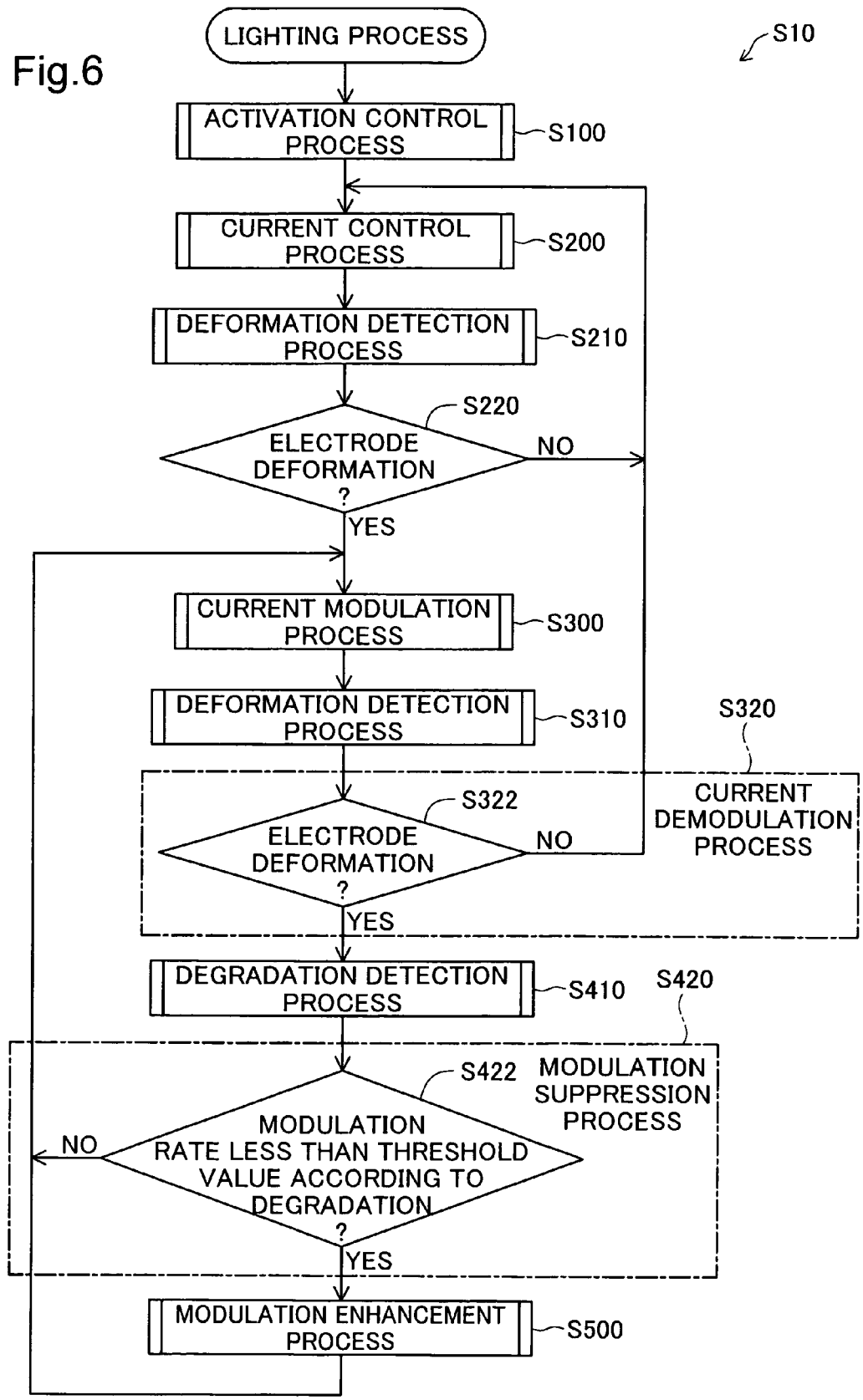
FIG. 6 is a flow chart showing lighting process executed by the drive device.

FIG. 6 is a flow chart showing the lighting process (step S10) executed by the drive device 600. The lighting process (step S10) is the process of lighting the discharge lamp 500. With this embodiment, when the projector 10 power supply is turned on, the drive control unit 610 of the drive device 600 starts the lighting process (step S10).

When the lighting process (step S10) is started, the drive control unit 610 executes the startup control process (step S100). With the startup control process (step S100), the drive control unit 610 executes control that starts up the discharge lamp 500 by outputting control signals to the lighting circuit 620.

After the discharge lamp 500 is started up by the startup control process (step S100), the drive control unit 610 executes the current control process (step S200). With the current control process (step S200), the drive control unit 610 controls the alternating current supplied from the lighting circuit 620 in the normal mode by outputting control signals to the lighting circuit 620.

Figure 7:
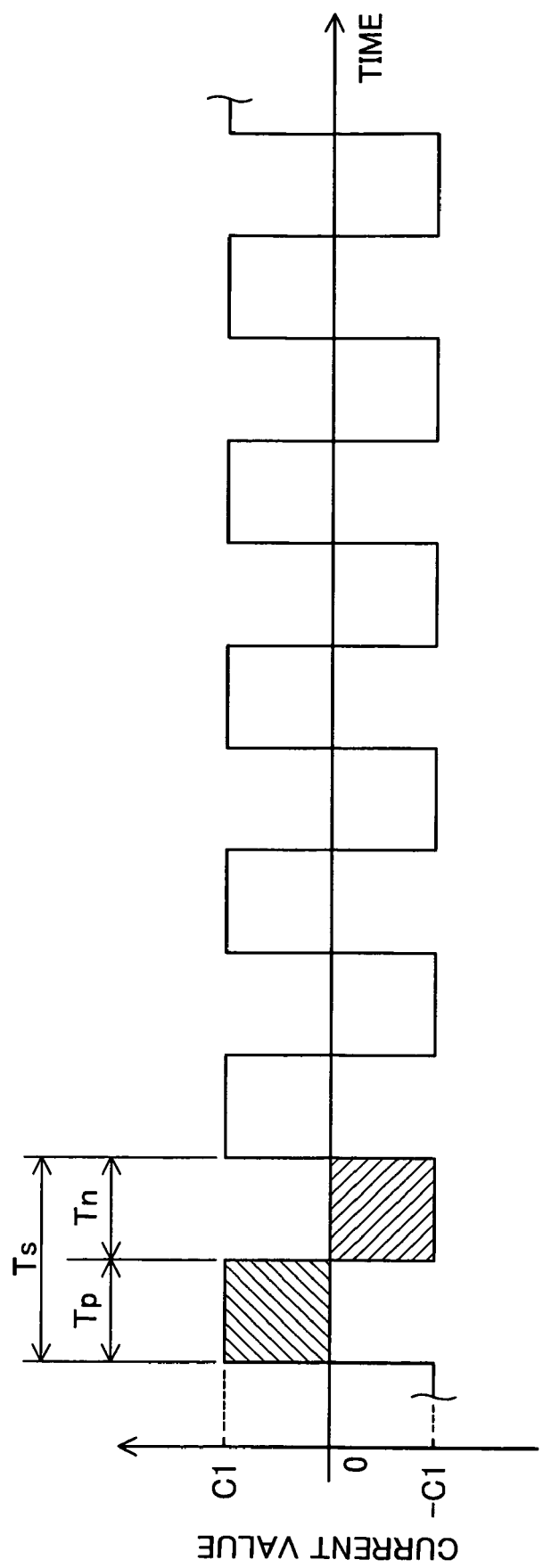
FIG. 7 is an explanatory drawing showing an example of alternating current supplied to the electrode in a normal mode.

FIG. 7 is an explanatory drawing showing an example of the alternating current supplied to the electrode 520a in the normal mode. FIG. 7 shows the alternating current supplied to the electrode 520a in the normal mode by having the electrode 520a operate as an anode and have a positive value for the current value, and having the electrode 520a operate as a cathode and have a negative value for the current value. While the electrode 520a operates as an anode, electrode 520b operates as a cathode, and while electrode 520a operates as a cathode, electrode 520b operates as an anode. In other words, a state is shown for which the alternating current supplied to the electrode 520b is an inversion of the positive/negative of the alternating current supplied to the electrode 520a.

As shown in FIG. 7, the alternating current supplied to the electrodes 520a and 520b in the normal mode is a square wave for which the absolute value is the same but positive and negative are different, and for which the polarity regularly switches between a positive current value "C1" and a negative current value "−C1." With this embodiment, in the normal mode, the polarity switching cycle for which the alternating current polarities switch alternately, is fixed at time Ts. With this embodiment, in the normal mode, the anode period in which the electrode 520a operates as an anode is fixed at time Tp, the cathode period in which the electrode 520a operates as a cathode is fixed at time Tn, and time Tp and time Tn are of equal length. Specifically, in the normal mode, the anode duty ratio which is the ratio at which the anode period of the electrode 520a occupies the polarity switching cycle is 50%.

Returning to the explanation of FIG. 6, while the alternating current supplied from the lighting circuit 620 is controlled in the normal mode by the current control process (step S200), the drive control unit 610 executes the deformation detection process (step S210). With the deformation detection process (step S210), the drive control unit 610 detects deformation of the projecting parts 526a and 526b due to the bumps and dents 529 formed on the electrodes 520a and 520b based on the output signals from the deformation sensor 632.

When deformation of the projecting parts 526*a* and 526*b* is not detected (step S220: No) with the deformation detection process (step S210), the drive control unit 610 continues to execute the current control process (step S200).

Meanwhile, when deformation of the projecting parts 526*a* and 526*b* is detected (step S220: Yes) with the deformation detection process (step S210), the drive control unit 610 executes the current modulation process (step S300). With the current modulation process (step S300), the drive control unit 610 controls the alternating current supplied from the lighting circuit 620 in the repair mode by modulating the normal mode alternating current controlled by the current control process (step S100). With this embodiment, in the repair mode, by the drive control unit 610 increasing the anode duty ratio at which the anode period of the deformed electrode for which deformation is detected of the electrodes 520*a* and 520*b* occupies the polarity switching cycle, the temperature of that deformed electrode rises. As a result, by the asperity 529 formed on the deformed electrode melting, the projecting parts 526*a* ad 526*b* are repaired.

Figure 8:
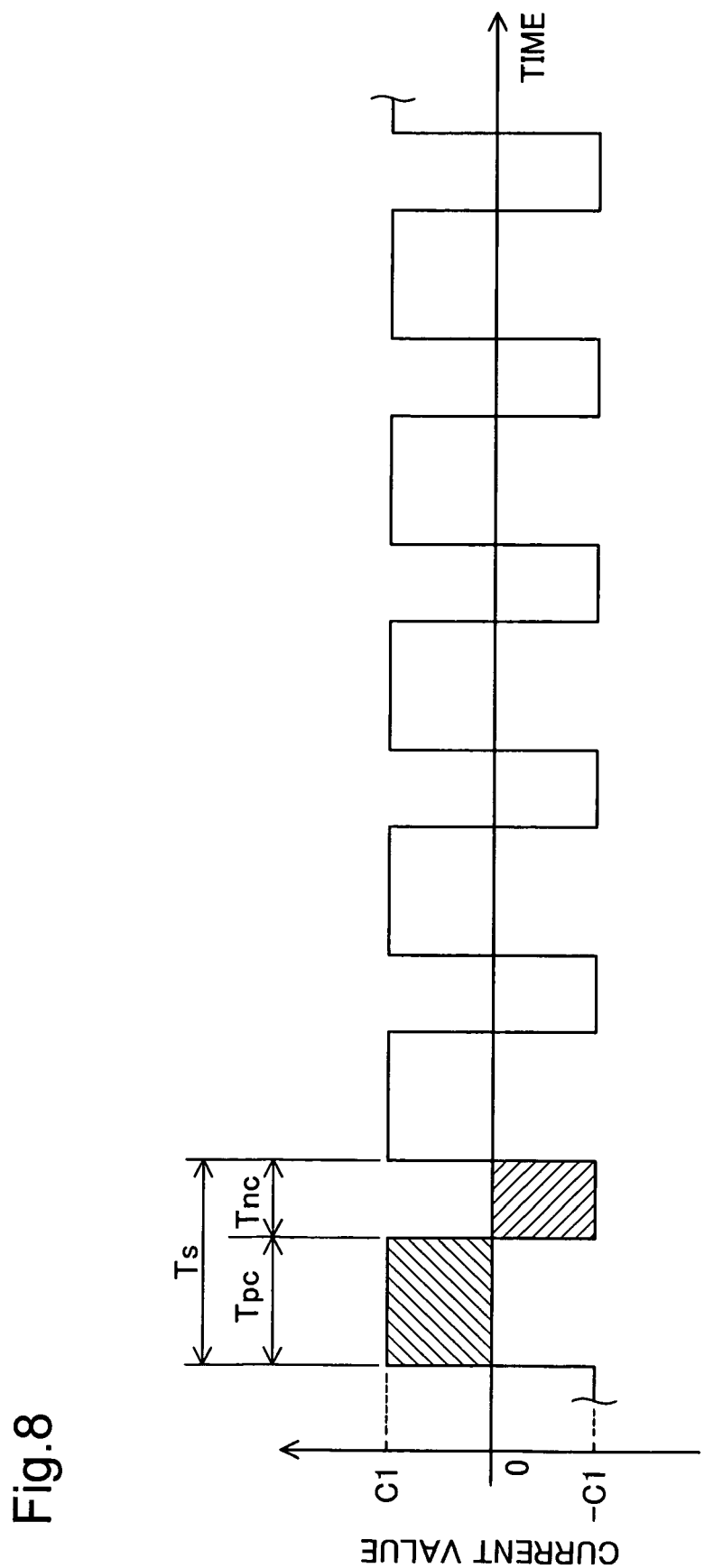
FIG. 8 is an explanatory drawing showing an example of alternating current supplied to the electrode in a repair mode.

FIG. 8 is an explanatory drawing showing an example of the alternating current supplied to the electrode 520*a* in the repair mode. By using positive and negative values the same way as in FIG. 7, FIG. 8 shows the alternating current supplied to the electrode 520*a* in the repair mode. The alternating current supplied to the electrode 520*b* exhibits a state for which the positive/negative of the alternating current supplied to the electrode 520*a* is inverted.

The repair mode alternating current shown in FIG. 8 is the same as the normal mode alternating current shown in FIG. 7 except for the point that in order to repair the projecting part 526*a* of the electrode 520*a*, the anode duty ratio at which the anode period of the electrode 520*a* occupies the polarity switching cycle is increased. With the repair mode in FIG. 8, compared to the normal mode of FIG. 7, the anode period for which the electrode 520*a* operates as an anode extends from the time Tp to the time Tpc, and the cathode period for which the electrode 520*a* operates as a cathode is shortened from the time Tn to the time Tnc by the amount for which the anode period increased. Specifically, with the repair mode of FIG. 8, the anode duty ratio at which the anode period of the electrode 520*a* occupies the polarity switching cycle exceeds 50%. By doing this, the electrical power energy supplied to the electrode 520*a* during the anode period of the electrode 520*a* is greater with the repair mode than with the normal mode. Note that when not repairing the electrode 520*a* but instead repairing the electrode 520*b*, the anode duty ratio at which the anode period of the electrode 520*a* occupies the polarity switching cycle is reduced, and the anode duty ratio at which the anode period of the electrode 520*b* occupies the polarity switching cycle is increased. With this embodiment, when moving from the normal mode to the repair mode, the anode duty ratio of the deformed electrode for which deformation is detected of the electrodes 520*a* and 520*b* is set to 55%.

Returning to the explanation of FIG. 6, while the alternating current supplied from the lighting circuit 620 is controlled in the modulation mode by the current modulation process (step S300), the drive control unit 610 executes the deformation detection process (step S310). With the deformation detection process (step S310), the drive control unit 610 detects deformation of the projecting parts 526*a* and 526*b* due to the asperity 529 formed on the electrodes 520*a* and 520*b* based on the output signals from the deformation sensor 632.

With the deformation detection process (step S310), when deformation of the projecting parts 526*a* and 526*b* is not detected, specifically, when the projecting parts 526*a* and 526*b* of the electrodes 520*a* and 520*b* have been repaired during the repair mode (step S322: No), the drive control unit 610 executes the current demodulation process (step S320). With the current demodulation process (step S320), the drive control unit 610 moves the control mode from the repair mode according to the current modulation process (step S300) to the normal mode according to the current control process (step S200).

Meanwhile, when deformation of the projecting parts 526*a* and 526*b* is detected with the deformation detection process (step S310), specifically when the projecting parts 526*a* and 526*b* of the electrodes 520*a* and 520*b* are not repaired during the repair mode (step S322: Yes), the drive control unit 610 executes the modulation enhancement process (step S500). With the modulation enhancement process (step S500), the drive control unit 610 increases the modulation ratio which is the ratio of the alternating current being modulated from the normal mode to the repair mode. With this embodiment, with the modulation enhancement process (step S500), of the electrodes 520*a* and 520*b*, the anode duty ratio of the deformed electrode for which deformation was detected is increased 1% at a time each time deformation is detected with the deformation detection process (step S310).

While the alternating current supplied from the lighting circuit 620 is being controlled in the modulation mode by the current modulation process (step S300), the drive control unit 610 executes the degradation detection process (step S410). With the degradation detection process (step S410), the drive control unit 610 detects the degradation progress status of the electrodes 520*a* and 520*b* based on the output signals from the degradation sensor 634. With this embodiment, with the degradation detection process (step S410), the drive control unit 610 calculates the life expectancy of the electrodes 520*a* and 520*b* based on the output signals from the degradation sensor 634, judges the electrodes 520*a* and 520*b* for which the life expectancy has exceeded half of the assumed product life to be the "initial products," and judges the electrodes 520*a* and 520*b* for which the life expectancy period has not yet reached half the assumed product life to be "degraded products."

After the degradation detection process (step S410), the drive control unit 610 executes the modulation suppression process (step S420). With the modulation suppression process (step S420), the drive control unit 610 suppresses an increase in the modulation ratio by the modulation enhancement process (step S500) according to the degradation progress status detected with the degradation detection process (step S410).

FIG. 9 is an explanatory drawing showing the experiment results with the anode duty ratio varied and alternating current supplied to the electrodes 520*a* and 520*b*. With the experiment in FIG. 9, electrodes 520*a* and 520*b* of the "initial product" for which the life expectancy exceeds half the assumed product life and electrodes 520*a* and 520*b* of the "degraded product" for which the life expectancy period does not reach half the assumed life product were prepared, the anode duty ratio was varied and alternating current was supplied, and the melting status of these electrodes was observed.

When the anode duty ratio was 50%, with both the initial product and the degraded product, the projecting parts 526*a* and 526*b* were not melted. When the anode duty ratio was 55%, with the initial product, the surface of the projecting parts 526*a* and 526*b* was melted and the asperity 529 generated on the projecting parts 526*a* and 526*b* disappeared, but a change in the shape of the projecting parts 526*a* and 526*b* themselves such as for which the arc discharge origin point would not be able to be determined was not seen, whereas with the degraded product, there was no melting of the projecting parts 526*a* and 526*b* such as that would eliminate the asperity 529. When the anode duty ratio was 60%, with both the initial product and the degraded product, the surface of the projecting parts 526a and 526b was melted and the asperity 529 generated on the projecting parts 526a and 526b disappeared, but a change in the shape of the projecting parts 526a and 526b themselves such as for which the arc discharge origin point would not be able to be determined was not seen. When the anode duty ratio was 65%, with the initial product, shape changes were observed for which repair was possible not only with melting of the asperity 529 but also with melting of the projecting parts 526a and 526b, and a state started for which the arc discharge origin point could not be determined and for which the arc length was longer than the desired length, whereas with the degraded product, the surface of the projecting parts 526a and 526b was melted and the asperity 529 generated on the projecting parts 526a and 526b disappeared, but a change in the shape of the projecting parts 526a and 526b themselves such as for which the arc discharge origin point would not be able to be determined was not seen. When the anode duty ratio was 70%, with the initial product, not only was the arc discharge origin point not possible to determine, but also, shape changes were observed for which repair was impossible due to melting of the projecting parts 526a and 526b for which the arc became long to the level of the light usage rate decreasing with the optical system at a later stage, whereas with the degraded product, shape changes were observed for which repair is possible not only with melting of the asperity 529 but also with melting of the projecting parts 526a and 526b, and a state started for which the arc discharge origin point could not be determined and for which the arc length was longer than the desired length.

With this embodiment, based on the experiment results shown in FIG. 9, with the modulation suppression process (step S420), the drive control unit 610 allows an increase in the anode duty ratio up to 60% by the modulation enhancement process (step S500) when it is determined to be an initial product with the degradation detection process (step S410), and allows an increase in the anode duty ratio up to 65% by the modulation enhancement process (step S500) when it is determined to be a degraded product with the degradation detection process (step S410).

A5. Effect

With the drive device 600 described above, by executing the modulation enhancement process (step S500) in the repair mode, it is possible to increase the modulation ratio of the alternating current supplied to the electrodes 520a and 520b according to the deformation of the protruding parts 526a and 526b of the electrodes 520a and 520b. By doing this, it is possible to repair the projecting parts 526a and 526b deformed by the asperity 529 while preventing insufficient melting and excessive melting of the projecting parts 526a and 526b. As a result, it is possible to lengthen the product life of the discharge lamp 500.

Also, with the modulation suppression process (step S420), since an increase in the modulation ratio of the alternating current supplied to the electrodes 520a and 520b is suppressed according to the degradation progress state of the electrodes 520a and 520b, it is possible to repair the projecting parts 526a ad 526b of the electrodes 520a and 520b to match the melting characteristics that differ with the degradation progress state.

Also, since the control mode moves from the repair mode to the normal mode when the projecting parts 526a and 526b of the electrodes 520a and 520b are repaired by executing the current demodulation process (step S320) in the repair mode, it is possible to prevent excessive melting of the projecting parts 526a and 526b.

B. First Variation Example

The drive device 600 of the first variation example is the same as the previously described embodiment except for the point that the waveform of the modulated alternating current is different in the repair mode.

Figure 10:
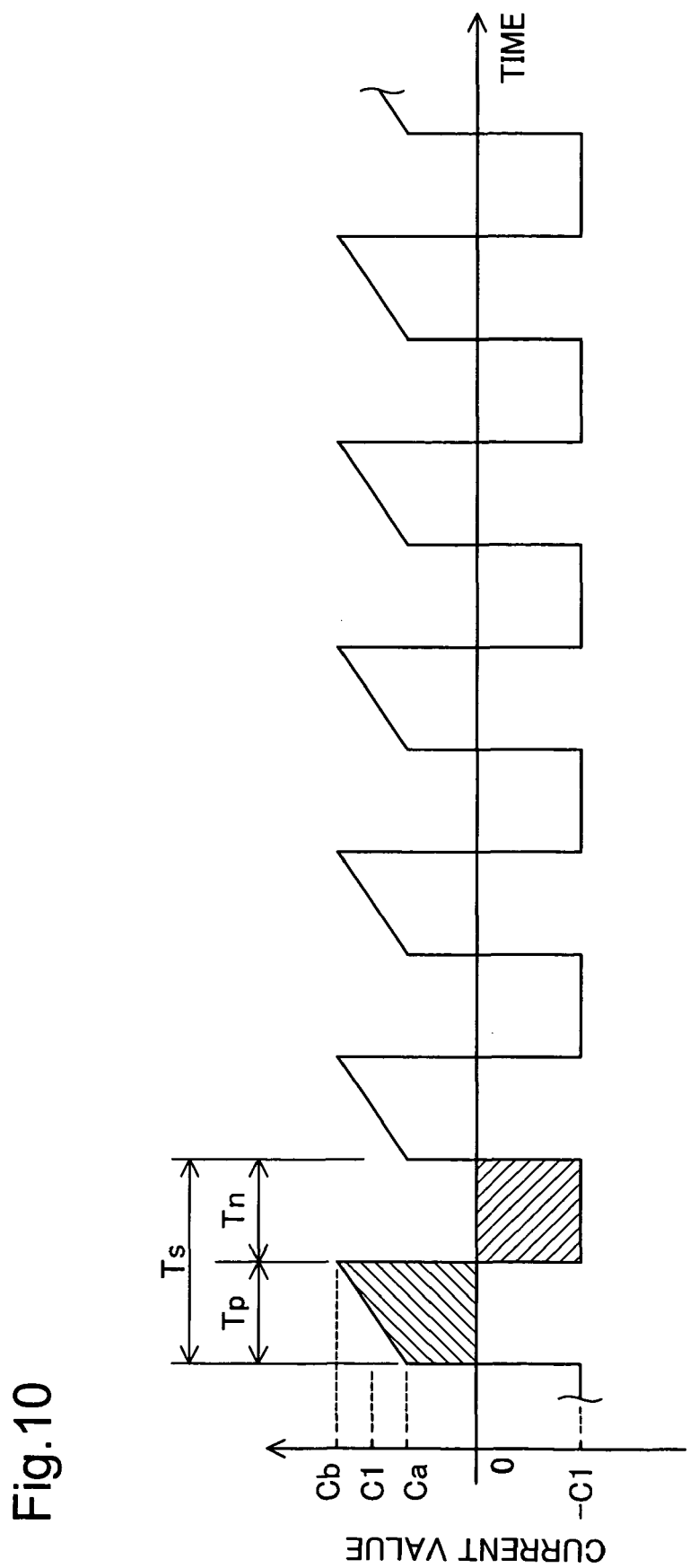
FIG. 10 is an explanatory drawing showing an example of alternating current supplied to the electrode in the repair mode of the first variation example.

FIG. 10 is an explanatory drawing showing an example of alternating current supplied to the electrode 520a in the repair mode of the first variation example. FIG. 10 shows the alternating current supplied to the electrode 520a in the repair mode by using the positive/negative values the same as in FIG. 7. The alternating current supplied to the electrode 520b shows a state for which the positive/negative of the alternating current supplied to the electrode 520a are inverted.

The alternating current of the repair mode shown in FIG. 10 is the same as the alternating current of the normal mode shown in FIG. 7 except for the point that in order to repair the projecting part 526a of the electrode 520a, the electrical power energy supplied to the electrode 520a during the anode period of the electrode 520a is unevenly distributed to the latter half of the anode period. With the repair mode of FIG. 10, each value of the anode period, the cathode period, and the polarity switching cycle is the same as each value in the normal mode of FIG. 7, and the electrical power energy supplied to the electrode 520a during the anode period is also the same as with the normal mode in FIG. 7, but the current value during the anode period gradually increases from a current value Ca smaller than the current value C1 to a current value Cb greater than the current value C1. Note that rather than in the case of repairing the electrode 520a, in the case of repairing the electrode 520b, the electrical power energy supplied to the electrode 520b during the anode period of the electrode 520b is distributed unevenly to the latter half of the anode period.

With this embodiment, when moving from the normal mode to the repair mode, the bias ratio of the current value Ca that starts the anode period and the current value Cb that ends the anode period is set to 20%. With this embodiment, with the modulation enhancement process (step S500), the bias ratio of the current value Ca that starts the anode period and the current value Cb that ends the anode period is increased 1% at a time each time deformation is detected with the deformation detection process (step S310).

FIG. 11 is an explanatory drawing showing the experiment results with the alternating current supplied to electrodes 520a and 520b with the bias ratio of the anode period changed. With the experiment in FIG. 11, electrodes 520a and 520b of the "initial products" for which the life expectancy exceeds half the assumed product life and electrodes 520a and 520b of the "degraded products" for which the life expectancy period does not reach half the assumed life product were prepared, alternating current for which the bias ratio of the anode period was varied was supplied, and the melting status of these electrodes was observed.

When the bias ratio was 0%, 5%, 10%, and 15%, with both the initial product and the degraded product, the projecting parts 526a and 526b were not melted. When the bias ratio was 20%, with the initial product, the surface of the projecting parts 526a and 526b was melted and the asperity 529 generated on the projecting parts 526a and 526b disappeared, but a change in the shape of the projecting parts 526a and 526b themselves such as for which the arc discharge origin point would not be able to be determined was not seen, whereas with the degraded product, there was no melting of the projecting parts 526a and 526b such as that would eliminate the asperity 529. When the bias ratio was 25% or 30%, with both the initial product and the degraded product, the surface of the projecting parts 526a and 526b was melted and the asperity 529 generated on the projecting parts 526a and 526b disappeared, but a change in the shape of the projecting parts 526a and 526b themselves such as for which the arc discharge origin point would not be able to be determined was not seen. When the bias ratio exceeded 30%, it was not possible to repair the projecting parts 526a and 526b in a state with the discharge lamp 500 properly lit because scroll noise occurred in the light emitted from the discharge lamp 500.

With the first variation example, based on the experiment results shown in FIG. 11, with the modulation suppression process (step S420), the drive control unit 610 allows an increase of the bias ratio of the anode period up to 30% by the modulation enhancement process (step S500). With the first variation example, it is also possible to omit the degradation detection process (step S410) since the increase of the bias ratio is limited to 30% for the electrodes 520a and 520b of both the initial product and the degradation product.

With the drive device 600 of the first variation example described above, the same as with the embodiment described previously, it is possible to repair the projecting parts 526a and 526b deformed by the asperity 529 while preventing insufficient melting and scroll noise of the projecting parts 526a and 526b.

C. Second Variation Example

The drive device 600 of the second variation example is the same as the embodiment described previously except for the point that the waveforms of the alternating current modulated in the repair mode are different.

Figure 12:
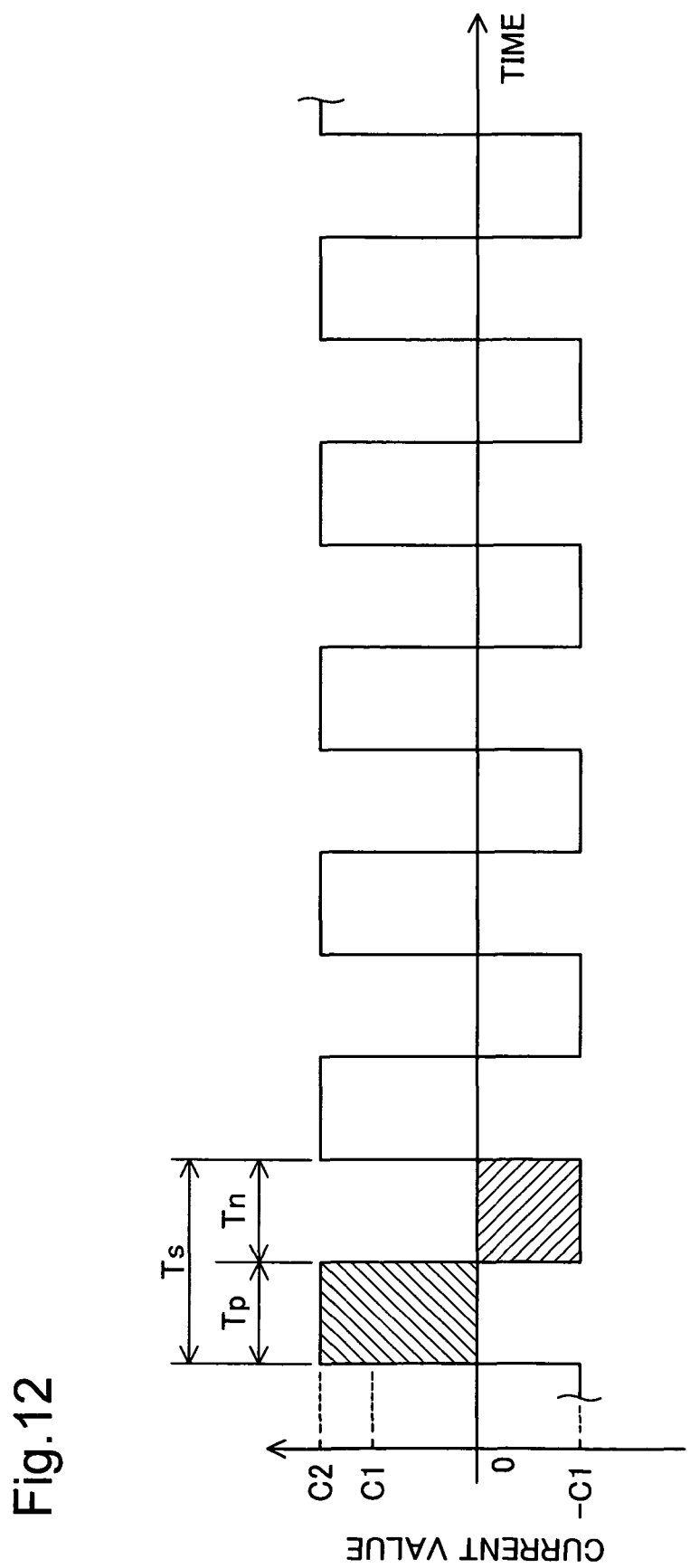
FIG. 12 is an explanatory drawing showing an example of alternating current supplied to the electrode in the repair mode of the second variation example.

FIG. 12 is an explanatory drawing showing an example of the alternating current supplied to the electrode 520a in the repair mode of the second variation example. FIG. 12 shows the alternating current supplied to the electrode 520a in the repair mode by using the positive/negative values in the same way as in FIG. 7. The alternating current supplied to the electrode 520b shows a state with the positive/negative of the alternating current supplied to the electrode 520a inverted.

The alternating current of the repair mode shown in FIG. 12 is the same as the alternating current of the normal mode shown in FIG. 7 except for the point that the electrical power energy supplied to the electrode 520a during the anode period of the electrode 520a is increased in order to repair the projecting part 526a of the electrode 520a. With the repair mode of FIG. 12, each value of the anode period, the cathode period, and the polarity switching cycle is the same as each value in the normal mode of FIG. 7, but the current value in the anode period increases to a current value C2 greater than the current value C1. Note that rather than when repairing the electrode 520a, when repairing the electrode 520b, the current value supplied to the electrode 520b during the anode period of the electrode 520b increases.

With this embodiment, when moving from the normal mode to the repair mode, the increase rate of increasing the current value C1 supplied during the anode period to the current value C2 is set to 20%. With this embodiment, in the modulation enhancement process (step S500), the increase rate of increasing the current value C1 supplied during the anode period to the current value C2 is increased 1% at a time each time deformation is detected with the deformation detection process (step S310).

With the drive device 600 of the second variation example described above, the same as with the embodiment described previously, it is possible to repair the projecting parts 526a and 526b deformed by the asperity 529 while preventing insufficient melting and excessive melting of the projecting parts 526a and 526b.

D. Third Variation Example

The drive device 600 of the third variation example is the same as that of the embodiment described previously except for the point that the waveforms of the alternating current in the normal mode differ. With the third variation example, the drive control unit 610 repeatedly varies the anode duty ratio up and down in the normal mode, and also, by expanding and contracting the polarity switching cycle synchronous with this up and down switching of the anode duty ratio, it controls the alternating current supplied from the lighting circuit 620. The increase of the anode duty ratio and the shortening of the polarity switching cycle promotes the growth of the projecting parts 526a and 526b of the electrodes 520a and 520b. From this fact, with the normal mode of the third variation example, by controlling according to the characteristics of the electrodes 520a and 520b, it is possible to prevent shrinkage and loss of the projecting parts 526a and 526b.

Figure 13:
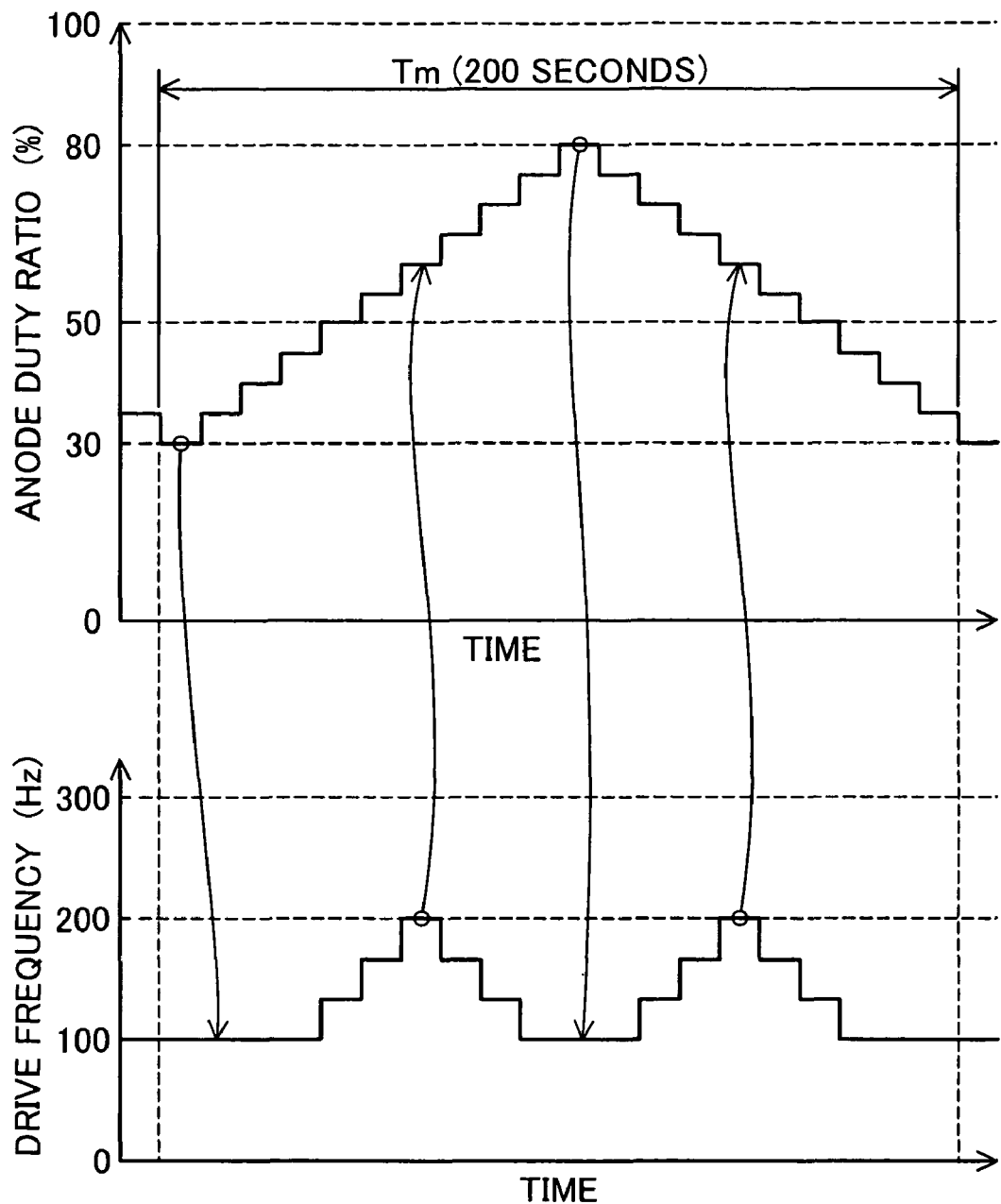
FIG. 13 is an explanatory drawing showing an example of an aspect of a anode duty ratio and a drive frequency being varied in a normal mode of the third variation example.

FIG. 13 is an explanatory drawing showing an example of an aspect of the anode duty ratio and the drive frequency being varied in the normal mode of the third variation example. With FIG. 13, the anode duty ratio shows the ratio for which the anode period of the electrode 520a occupies the polarity switching cycle, and the drive frequency is the reciprocal number of the polarity switching cycle and shows the number of times the polarity is switched per unit of time. The alternating current of the normal mode of the third variation example has a waveform for which the square wave shown in FIG. 7 is modulated by the anode duty ratio and the drive frequency shown in FIG. 13. The alternating current of the repair mode of the third variation example is a waveform for which the square wave modulated by the anode duty ratio and the drive frequency shown in FIG. 13 has the anode duty ratio further increased.

As shown in FIG. 13, with the third variation example, the anode duty ratio is repeatedly varied up and down between 30% and 80%, and synchronous with this varying of the anode duty ratio, the drive frequency is repeatedly varied up and down between 100 Hz and 200 Hz. With the third variation, the electrode 520b has heat accumulate more easily than the electrode 520a from the effect of the sub reflective mirror 214, so by setting the cumulative time for which the electrode 520a operates as an anode longer than that of the electrode 520b, the temperature for the electrodes 520a and 520b can be made even. With this embodiment, at the timing when the anode duty ratio is the maximum value and minimum value, the drive frequency becomes the minimum value of 100 Hz, and at the timing the anode duty ratio goes back and forth to around 50%, the drive frequency becomes the maximum value of 200 Hz.

With the drive device 600 of the third variation example described above, the same as with the embodiment described previously, it is possible to repair the projecting parts 526a and 526b deformed by the asperity 529 while preventing insufficient melting and excessive melting of the projecting parts 526a and 526b. Also, by controlling the increase in the anode duty ratio and the shortening of the polarity switching cycle that promote the growth of the projecting parts 526a and 526b according to the characteristics of the electrodes 520a and 520b, it is possible to prevent shrinkage and loss of the projecting parts 526a and 526b.

E. OTHER EMBODIMENTS

Above, we described embodiments of the invention, but these embodiments do not limit the invention in any way, and it is obvious that various aspects can be implemented within a scope that does not stray from the key points of the invention. For example, in the repair mode, the modulation ratio at which the normal mode alternating current is modulated can of course be suitably changed according to the characteristics of the electrodes 520a and 520b. Also, modulation of the alternating current in the repair mode is not limited to being one of an increase in the anode duty ratio, an increase in the current value during the anode period, or uneven distribution of the electric power energy during the anode period, but can also be a combination of two or more of these modulations.

According to the first aspect of the invention, each of the first and second electrodes may include a shaft part, a block part and a projecting part. The shaft part extends toward the other electrode. The block part has a diameter larger than the shaft part and faces the other electrode on a tip of the shaft part. The projecting part projects toward the other electrode on the block part near the other electrode. The deformation detector unit may detect deformation resulting from an asperity smaller than the projecting part on the surface of the projecting part as the deformation of the surface shape of the first and second electrodes. The current modulation unit may modulate the alternating current controlled by the current control unit to melt the asperity on the surface of the projecting part. With this drive device, it is possible to melt the asperity formed on the projecting parts while maintaining the shape of the projecting parts on the first and second electrodes. By doing this, it is possible to prevent shrinkage and loss of the projecting part due to excessive melting.

According to the first aspect of the invention, the drive device may further include a degradation detection unit and a modulation suppression unit. The degradation detection unit detects progress in degradation of the first and second electrodes. The modulation suppression unit suppresses increase of the modulation ratio by the modulation enhancement unit according to the detected progress in the degradation. With this drive device, it is possible to repair the surface shape of the first and second electrodes to match the melting characteristics that differ by progress in degradation.

According to the first aspect of the invention, the drive device may further include a current demodulation unit. The current demodulation unit restores the alternating current modulated by the current modulating unit when the deformation detection unit detects no deformation of the surface shape while modulating the alternating current by the current modulation unit. With this drive device, it is possible to prevent excessive melting of the first and second electrodes.

According to the first aspect of the invention, the current modulation unit may include a primary modulation unit. The primary modulation unit increases electrical power energy supplied to a target electrode during an anode period for which the target electrode operates as an anode, the target electrode being one of the first and second electrodes. With this drive device, it is possible to selectively melt the surface of one of the electrodes.

According to the above mentioned drive device, the primary modulation unit may execute at least one of extension of the anode period and increase of a current value supplied to the target electrode during the anode period to increase the electrical power energy. With this drive device, it is possible to increase the electrical power energy supplied to one of the electrodes using relatively easy control.

According to the first aspect of the invention, the current modulation unit may include a secondary modulation unit. The secondary modulation unit biases electrical power energy supplied to a target electrode during an anode period for which the target electrode operates as an anode toward a latter half of the anode period, the target electrode being one of the first and second electrodes. With this drive device, it is possible to selectively melt the surface of one of the electrodes.

According to the first aspect of the invention, the current control unit may repeatedly vary up and down an anode duty ratio between anode periods for which the first and second electrodes respectively operate as anodes, and expands and contracts a polarity switching cycle for alternately switching polarities of the alternating current synchronous with a fluctuation of the anode duty ratio, to control the alternating current supplied from the lighting circuit. With this drive device, it is possible to prevent projecting part shrinkage and loss by controlling the increase in the anode duty ratio and the shortening of the polarity switching cycle that promotes growth of the projecting part according to the characteristics of the first and second electrodes.

Although the invention has been described and illustrated in detail, it is clearly understood that the same is by way of illustration and example only and is not to be taken by way of limitation, the spirit and scope of the invention being limited only by the terms of the appended claims.

What is claimed is:

1. A drive apparatus that drives a discharge lamp, the discharge lamp including first and second electrodes configured to generate arc discharge to emit light, the drive apparatus comprising:
a lighting circuit that supplies alternating current to the first and second electrodes;
a current control unit that regulates the lighting circuit to control the alternating current;
a deformation detection unit that detects deformation of the surface shape of the first or the second electrode;
a current modulation unit that modulates the alternating current controlled by the current control unit when the deformation detection unit detects the deformation of the surface shape of the first or the second electrode; and
a modulation enhancement unit that increases a modulation ratio at which the current modulation unit modulates the alternating current when the deformation detection unit further detects the deformation of the surface shape of the first or the second electrode while modulating the alternating current by the current modulation unit.

2. A drive apparatus according to claim 1,
wherein each of the first and second electrodes includes:
a shaft part that extends toward the other electrode;
a block part that has a diameter larger than the shaft part and faces the other electrode on a tip of the shaft part; and
a projecting part that projects toward the other electrode on the block part near the other electrode,
wherein the deformation detector unit detects deformation resulting from an asperity smaller than the projecting part on the surface of the projecting part as the deformation of the surface shape of the first or the second electrode,
wherein the current modulation unit modulates the alternating current controlled by the current control unit to melt the asperity on the surface of the projecting part.

3. A drive apparatus according to claim 1, further comprising:
 a degradation detection unit that detects progress in degradation of the first or the second electrode, and
 a modulation suppression unit that suppresses increase of the modulation ratio by the modulation enhancement unit according to the detected progress in the degradation.

4. A drive apparatus according to claim 1, further comprising: a current demodulation unit that restores the alternating current modulated by the current modulating unit when the deformation detection unit detects no deformation of the surface shape of the first or the second electrode while modulating the alternating current by the current modulation unit.

5. A drive apparatus according to claim 1, wherein the current modulation unit includes a primary modulation unit that increases electrical power energy supplied to a target electrode during an anode period for which the target electrode operates as an anode, the target electrode being one of the first and second electrodes.

6. A drive apparatus according to claim 5, wherein the primary modulation unit executes at least one of extension of the anode period and increase of a current value supplied to the target electrode during the anode period to increase the electrical power energy.

7. A drive apparatus according to claim 1, wherein the current modulation unit includes a secondary modulation unit that biases electrical power energy supplied to a target electrode during an anode period for which the target electrode operates as an anode toward a latter half of the anode period, the target electrode being one of the first and second electrodes.

8. A drive apparatus according to claim 1, wherein the current control unit repeatedly varies up and down an anode duty ratio between anode periods for which one of the first and second electrodes respectively operates as an anode, and expands and contracts a polarity switching cycle configured to alternately switch polarities of the alternating current synchronous with a fluctuation of the anode duty ratio, to control the alternating current supplied from the lighting circuit.

9. A light source apparatus comprising:
 a discharge lamp that includes first and second electrodes configured to generate arc discharge to emit light;
 a lighting circuit that supplies alternating current to the first and second electrodes;
 a current control unit that regulates the lighting circuit to control the alternating current;
 a deformation detection unit that detects deformation of the surface shape of the first or the second electrode;
 a current modulation unit that modulates the alternating current controlled by the current control unit when the deformation detection unit detects the deformation of the surface shape of the first or the second electrode; and
 a modulation enhancement unit that increases a modulation ratio at which the current modulation unit modulates the alternating current when the deformation detection unit further detects the deformation of the surface shape of the first or the second electrode while modulating the alternating current by the current modulation unit.

10. A projector apparatus that projects an image, the projector apparatus comprising:
 a discharge lamp that includes first and second electrodes configured to generate arc discharge to emit light as a light source of projection light for the image;
 a lighting circuit that supplies alternating current to the first and second electrodes;
 a current control unit that regulates the lighting circuit to control the alternating current;
 a deformation detection unit that detects deformation of the surface shape of the first or the second electrode;
 a current modulation unit that modulates the alternating current controlled by the current control unit when the deformation detection unit detects the deformation of the surface shape of the first or the second electrode; and
 a modulation enhancement unit that increases a modulation ratio at which the current modulation unit modulates the alternating current when the deformation detection unit further detects the deformation of the surface shape of the first or the second electrode while modulating the alternating current by the current modulation unit.

11. A drive method for driving a discharge lamp, the discharge lamp including first and second electrodes configured to generate arc discharge to emit light, the method comprising the steps of:
 supplying alternating current to the first and second electrodes;
 detecting deformation of the surface shape of the first or the second electrode;
 modulating the alternating current configured to supply to the first and second electrodes when the deformation of the surface shape is detected; and
 increasing a modulation ratio configured to modulate the alternating current when the deformation of the surface shape of the first or the second electrode is further detected while modulating the alternating current.

\* \* \* \* \*